(12) United States Patent
Zhou

(10) Patent No.: US 9,764,444 B2
(45) Date of Patent: Sep. 19, 2017

(54) POWER TOOL

(71) Applicant: CHERVON INTELLECTUAL PROPERTY LIMITED, Road Town (VG)

(72) Inventor: Hongtao Zhou, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 32 days.

(21) Appl. No.: 14/927,680

(22) Filed: Oct. 30, 2015

(65) Prior Publication Data

US 2016/0045998 A1 Feb. 18, 2016

Related U.S. Application Data

(63) Continuation of application No. 13/471,599, filed on May 15, 2012, now Pat. No. 9,174,354.

(30) Foreign Application Priority Data

May 18, 2011 (CN) .......................... 2011 1 0128110
May 18, 2011 (CN) .......................... 2011 1 0128114

(51) Int. Cl.
| | |
|---|---|
| *B23B 31/10* | (2006.01) |
| *B27B 5/32* | (2006.01) |
| *B24B 45/00* | (2006.01) |
| *B25F 5/00* | (2006.01) |
| *B27B 19/00* | (2006.01) |

(Continued)

(52) U.S. Cl.
CPC .............. *B24B 45/006* (2013.01); *B23Q 3/12* (2013.01); *B24B 23/04* (2013.01); *B24B 27/08* (2013.01); *B25F 5/00* (2013.01); *B27B 5/32* (2013.01); *B27B 19/006* (2013.01); *B23B 31/10* (2013.01); *Y10T 279/33* (2015.01); *Y10T 279/3451* (2015.01)

(58) Field of Classification Search
CPC ......... B23Q 3/12; B24B 45/006; B24B 27/08; B24B 23/04; B27B 19/006; B27B 5/32; B25F 5/00; B23B 31/10; Y10T 279/33
See application file for complete search history.

(56) References Cited

U.S. PATENT DOCUMENTS 4,597,227 A * 7/1986 Gentischer .............. B24B 23/02
 451/342
6,569,001 B2 5/2003 Rudolf et al.
(Continued)

FOREIGN PATENT DOCUMENTS

DE EP 1790434 A1 * 5/2007 ........... B24B 23/022
TW EP 1946889 A1 * 7/2008 ........... B24B 23/028

*Primary Examiner* — Eric A Gates
*Assistant Examiner* — Chwen-Wei Su
(74) *Attorney, Agent, or Firm* — Greenberg Traurig, LLP

(57) ABSTRACT

A power tool has a driving shaft for driving a working element and a clamping device for clamping the working element. The clamping device has a clamping position in which the working element may be fixed relative to the driving shaft and a release position in which the working element can be removed from the driving shaft. An operating member is coupled to the clamping device for moving the clamping device between positions. The clamping device also has a rotating position in which the working element can be rotated by an angle relative to the driving shaft and the operating member has an operating position that corresponds to the rotating position.

7 Claims, 12 Drawing Sheets

(51) Int. Cl.
   *B24B 23/04*     (2006.01)
   *B24B 27/08*     (2006.01)
   *B23Q 3/12*      (2006.01)

(56) References Cited

U.S. PATENT DOCUMENTS

| | | |
|---|---|---|
| 6,945,862 B2 | 9/2005 | Jasch et al. |
| 7,344,435 B2 | 3/2008 | Pollak et al. |
| 7,736,216 B2 | 6/2010 | King et al. |
| 7,997,586 B2 | 8/2011 | Ziegler et al. |
| 8,182,316 B2 | 5/2012 | Peisert |
| 2003/0190877 A1 | 10/2003 | Gallagher et al. |
| 2006/0282108 A1 | 12/2006 | Tanner |
| 2009/0023371 A1 | 1/2009 | Blickle et al. |
| 2011/0209888 A1* | 9/2011 | Elsworthy ........... B23B 31/1071 173/217 |
| 2011/0266758 A1 | 11/2011 | Sergyeyenko et al. |
| 2011/0309589 A1 | 12/2011 | Maras |

\* cited by examiner

POWER TOOL

RELATED APPLICATION INFORMATION

This application is a continuation of and claims the benefit of U.S. application Ser. No. 13/471,599, filed on May 15, 2012, which application claims the benefit of CN 201110128110.2, filed on May 18, 2011, and CN 201110128114, filed on May 18, 2011, the disclosures of which are incorporated herein by reference in its entirety.

BACKGROUND

The following generally relates to a power tool and, more particularly, to a power tool having an output shaft for driving a working element, a fastening member for clamping the working element to one end of the output shaft, and a moving device for enabling the fastening member to move between a release position in which the fastening member may be removed from the output shaft by disengaging from the moving device and a clamping position in which the fastening member can support the end of the output shaft so as to firmly clamp the working element by locking the moving device and the cooperation of a spring member.

U.S. Pat. No. 6,569,001 discloses a power tool having a quick clamping device. The power tool is an angle grinder with a hollow spindle mounted therein. A clamping device is mounted in the hollow spindle, which can be moved between a clamping position and a release position along the axial direction of the spindle. The clamping device comprises a clamping flange with a threaded pin in the middle thereof. The clamping flange is used to mate with a counter flange on one end of the hollow spindle so as to clamp the working element therebetween. The hollow spindle is also provided with a thrust piece therein for mating with the threaded pin. In the clamping position, the threaded pin is threaded into the thrust piece and kept in the clamping position under the action of the spring force, and in the release position, the thrust piece pushes the threaded pin so as to force the clamping flange to overcome the action of the spring force and disengage from the surface of the clamped working element. In this state, when the clamping flange rotates relative to the clamped working element, there is no friction therebetween, so the threaded pin of the clamping flange can be threaded out of the thrust piece without any tools. Thereby it is convenient to replace the working element. Although this clamping device can substantially clamp the working element to the output shaft of the power tool without any tools, this clamping device is only suitable for clamping the working element which is driven to rotate. If the working element is driven by an oscillation device to oscillate back and forth about the longitudinal axis of the output shaft, it may cause a relative large mutation torque and a large impact in the two directions of the rotation. Thus it cannot make sure that the working element may be firmly clamped by a known clamping device.

The power tool in the prior art also has a defect that the working element clamped on the power tool cannot be adjusted between multiple angles. The working element is either in a clamping state for operation or in a release state for removing. When it is needed to adjust an angle of the working element, the working element must be removed and clamped again. Thus the operation is laborious and time consuming, which is not convenient.

SUMMARY

Regarding the defects existing in the prior art, the present invention provides a power tool and a working element that can be clamped to a driving shaft of the power tool while being adjustable over multiple angles.

In order to resolve the above technical problem, the present invention provides a power tool, comprising: a driving shaft for driving a working element; a clamping device for clamping the working element, the clamping device having a clamping position in which the working element is fixed relative to the driving shaft and a released position in which the working element is removable from the driving shaft; and an operating member being manually operable; wherein, the clamping device further has a rotating position in which the working element is rotatable by an angle relative to the driving shaft, and the operating member has an operating position corresponding to the rotating position.

Further, the driving shaft may be driven in an oscillation way about a longitudinal axis thereof.

Further, the driving shaft may comprise a hollow spindle and the clamping device may comprise a fastening element having a clamping shaft insertable into the spindle and a locking assembly for locking the clamping shaft into the spindle.

Further, in the clamping position, the fastening element may be locked by the locking assembly and located in a first locking position whereby, in the rotating position, the fastening element is locked by the locking assembly and located in a second locking position and, in the release position, the fastening element is releasable from the locking assembly.

Further, the locking assembly may comprise a locking member, an intermediate member and a moving member where the intermediate member is engaged between the locking member and the moving member, the moving member has a concave portion and a straight portion, and the intermediate portion is abutted against the concave portion or the straight portion selectively.

Further, the locking member may be connected to the clamping shaft of the fastening element by a form-fit structure in the first and second locking positions.

Further, the form-fit structure may comprise annular grooves or teeth on the clamped shaft and the locking member.

Further, the driving shaft may be connected with a flange member movable along the axial direction of the driving shaft, the flange member having a first end adapted for mating with the driving shaft and a second end for clamping the working element to the fastening element.

Further, the first end of the flange member may be unrotatably connected to the driving shaft in the clamping position and be disengageable from an end of the driving shaft in the rotating position.

With one or more of the above technical solutions, the present invention can obtain the following technical effects:
  (1) The clamping device for clamping the working element has a clamping position, a rotating position, and a release position of the working element. Thus, compared with a clamping device only having a clamping position and a release position, it can perform an angular adjustment without removing the working element, which saves time and effort.
  (2) The clamping device can fasten the working element to the output shaft quickly and reliably without using tools such as a wrench. Differing from the threaded connection in the prior art, it can obtain a strong clamping force which can make sure that the working element can be clamped reliably and firmly even if there is an impact caused in the tool driven by the oscillation driving device.

(3) The operating member has an operating position corresponding to the rotating position of the clamping device. Thus, operation is simple, convenient and has a strong hand feeling.

BRIEF DESCRIPTION OF THE DRAWINGS

FIG. 1b is an outer side view of FIG. 1a;

FIG. 2b is an outer side view of FIG. 2a;

FIG. 3b is an outer side view of FIG. 3a;

DETAILED DESCRIPTION

Figure 7:
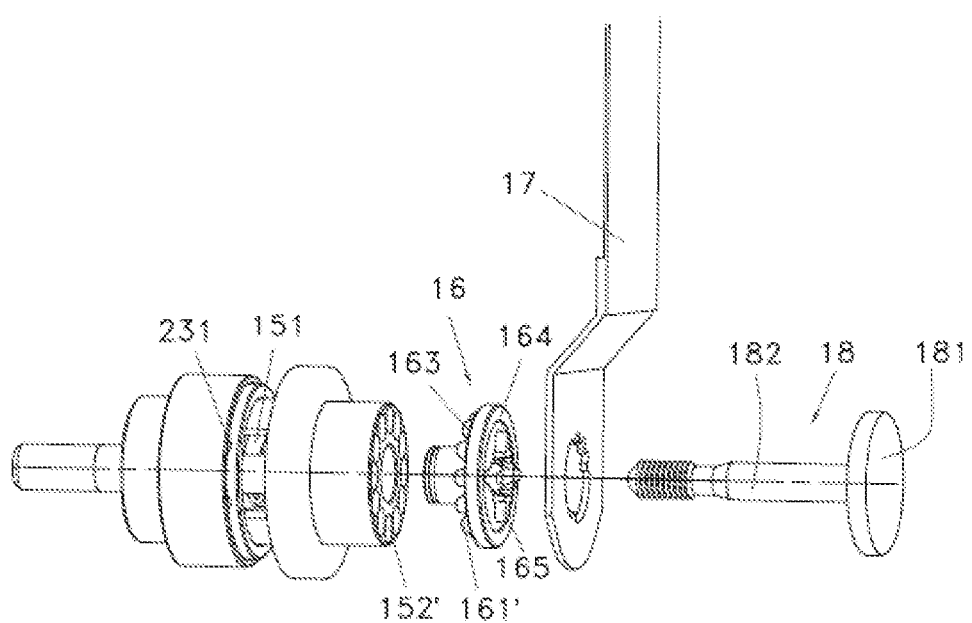
FIG. 7 is an exploded view of the further clamping device.
Figure 8A:
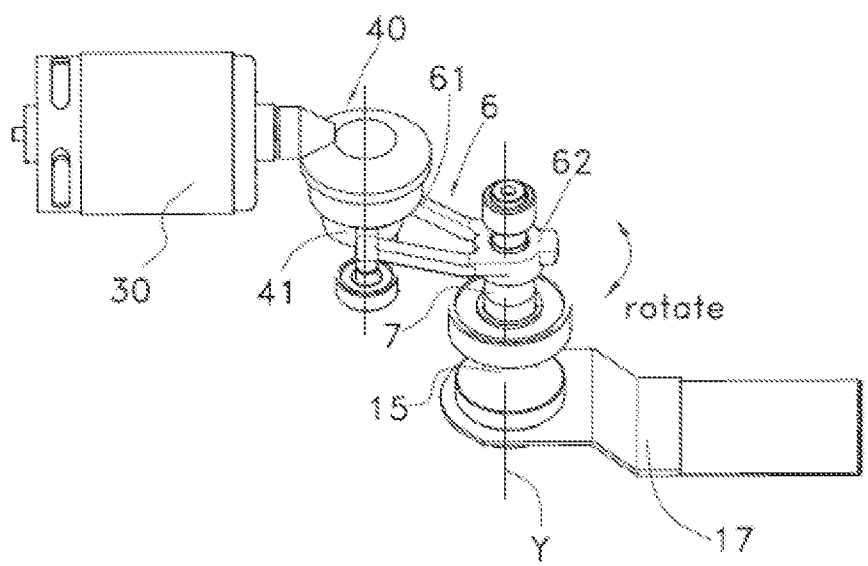
FIG. 8 a is an isometric view showing that the working element of the power tool can be adjusted angularly, wherein the working element is in a first working position of oscillation about the axis of the driving shaft.
FIG. 8b is an isometric view showing the working element in a second working position of oscillation about the axis of the driving shaft, and the second working position has a turning angle relative to the first working position.
Figure 8B:
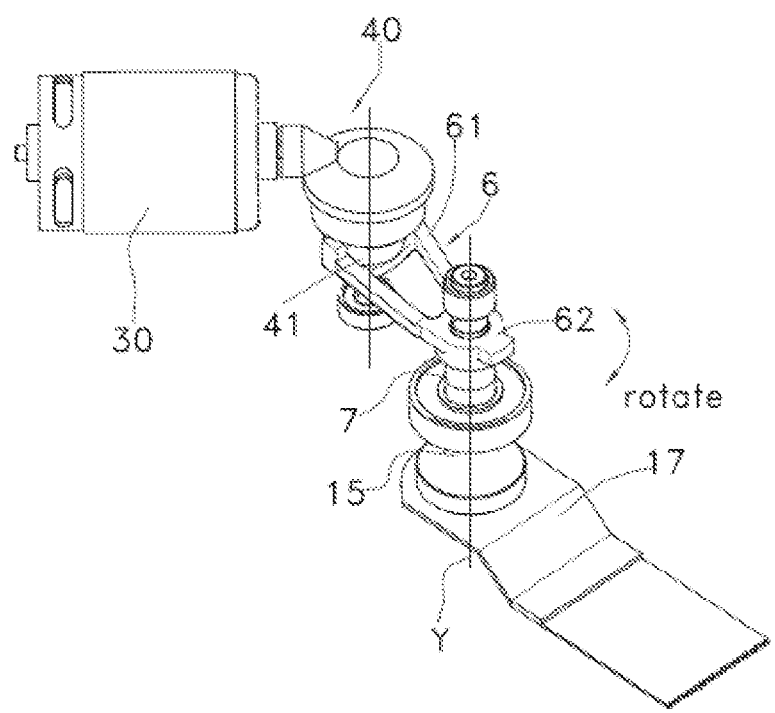

Next, the present invention will be further explained in details with reference to the drawings. As shown in FIGS. 1a to 4c and FIG. 7, the present invention will be illustrated preferably with reference to a power tool 1 for driving a working element 17 in an oscillation way. Driving in an oscillation way can be widely understood as a to-and-fro rotation motion or a combined motion including a to-and-fro rotation motion and a reciprocating movement of the working element driven by a multifunctional tool in the current market. The working element may be a saw blade for cutting, a grinder for grinding, etc. In this embodiment, the working element 17 is a saw blade for cutting. A driving shaft of the power tool 1 is supported by bearings 6, 20 and oscillated back and forth with a small oscillation angle in a high frequency about an axis Y as shown in FIGS. 8a and 8b under the action of a coupling fork 8. The driving shaft comprises a supporting journal 7 and a hollow spindle 15. The coupling fork 8 is assembled onto the supporting journal 7 by an interference fit, and the supporting journal 7 is assembled onto the hollow spindle 15 by an interference fit.

The working element 17 can be clamped to the power tool 1 quickly by a clamping device. The clamping device comprises a fastening element 18 and a locking assembly for locking the fastening element 18. The fastening element 18 comprises a flange portion 181 and a clamping shaft 182 substantially perpendicular to the flange portion 181. The clamped shaft 182 can be inserted into the spindle 15 and locked or released by the locking assembly. The locking assembly comprises a pressing ring 23, a locking block 10, and a steel ball 11. The pressing ring 23 surrounds the spindle 15 and has an opening 231. A pin 12 is mounted in the opening 231 and passes through a long groove 151 arranged in the axial direction on the spindle 15. A sleeve 24 is mounted and surrounds the pressing ring 23 so as to prevent the pin 12 from sliding out. The pin 12 can be moved together with the pressing ring 23 in the long groove 151 under the action of a pressing rod 5. A large spring 13 is abutted against by the pin 12 in the spindle 15. A form-fit structure is provided at the engagement portions of the locking block 10 and the clamping shaft 182, which is configured as annular grooves or teeth. Preferably, two locking blocks 10 are arranged symmetrically relative to the clamping shaft 182, and have a certain displacement in both radial and axial directions. Specially, in the axial direction, the lower ends of the locking blocks 10 are pushed by the two pins 12. When the locking blocks 10 are at an uppermost position, they are stopped by a lower surface 71 of the supporting journal 7. The upper ends of the locking blocks 10 are biased by a pressure spring 9. When the locking blocks 10 are at a lowermost position, they are stopped by a stopping plate (not shown) fixed on the supporting journal 7. In the radial direction, the two locking blocks 10 can be pushed towards each other by the steel balls 11, and separated by the pulling force of the clamping shaft 182. The pressing ring 23 has an oblique surface 232 and a straight surface 233 in its inner surface. The oblique surface 232 is at the upper end of the inner surface. The steel balls 11 can roll along the oblique surface 232 and straight surface 233 of the pressing ring 23. When the steel balls 11 roll along the straight surface 233 of the pressing ring 23, the two locking blocks 10 move towards each other, and the locking blocks 10 are then engaged with the clamping shaft 182. When the steel balls 11 roll along the oblique surface 232 of the pressing ring 23, the two locking blocks 10 are separated, and the locking blocks 10 are disengaged from the clamping shaft 182.

The power tool of the present invention further comprises an operating assembly so that a user can operate the clamping device manually. The operating assembly comprises an operating lever 2, an eccentric block 3, a pivoting shaft 4 and a pressing rod 5. The lever 2, the eccentric block 3 and the pivoting shaft 4 are assembled through interference fit. The pivoting shaft 4 can be rotated about the housing 1', and the lever 2 and the eccentric block 3 can be rotated about the housing 1' accordingly. The contact surface of the eccentric block 3 and the pressing rod 5 is composed of multi-section lines. The upper end of the pressing rod 5 can be pushed by the eccentric block 3, and the lower end of the pressing rod 5 bears against the sleeve 24. The pressing rod 5 can be moved up and down. When the pressing rod 5 moves downward, it can push the pressing ring 23 to move downward.

In this embodiment, a flange assembly is arranged between one end of the spindle 15 and the fastening element 18 of the clamping device. The flange assembly can be moved along the axis Y of the output shaft and adjusted angularly about the axis Y. The flange assembly includes an inner flange 16 and a tube 14 pressed fit into the inner flange 16. Alternatively, the inner flange 16 and the tube 14 may be integrated. The tube 14 can be pushed by the pin 12. The inner flange 16 has a first end 163 adapted for mating with the spindle 15 and a second end 164 for clamping the working element 17 onto the flange portion 181 of the fastening element 18. The first end 163 is provided with projections 161 adapted for mating with grooves 152 on the lower end of the spindle 15. The second end 164 is provided with a torque driving structure for driving the working element 17 to oscillate circumferentially. The torque driving structure may be projections 165. The lowermost position of the inner flange tube 14 and the inner flange 16 in the axial direction is limited by a collar 19 fitted on the tube 14. The collar 19 can abut against the inner surface of the spindle 15 so as to prevent the tube 14 and the inner flange 16 sliding out of the spindle 15.

Next, the process and principle of clamping the working element on the power tool according to the present invention will be explained in details.

Figure 1A:
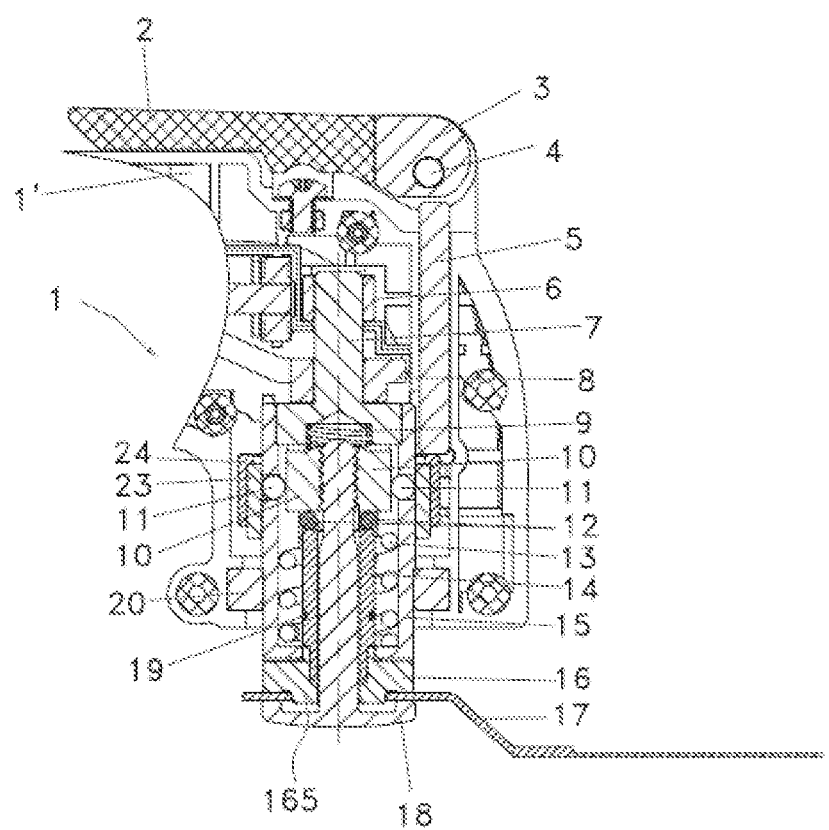
FIG. 1a is a schematic view of a power tool with an exemplary working element clamped thereon according to the description that follows, wherein a clamping device is in a clamping position.
Figure 1B:
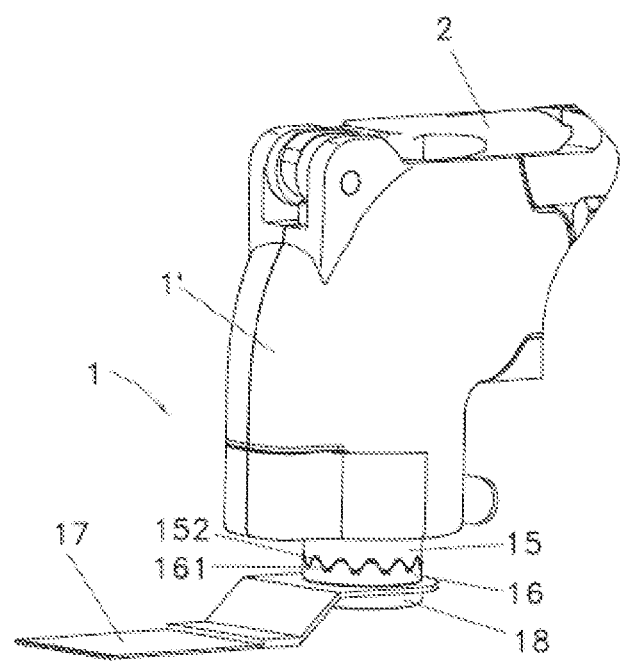

Refer to FIG. 1a and FIG. 1b, which show the clamped state. The eccentric block 3 is disengaged from the pressing rod 5, the upper end of the pressing ring 23 is then free. Thus, the locking block 10 engaging with the clamping shaft 182 is biased upwardly under the action of the large spring 13. The clamping shaft 182 tends to be lifted upwards, so that the working element 17 is pressed tightly between the inner flange 16 and the fastening element 18. As a result, the working element 17 is clamped. At this time, the clamping shaft 182 is in a first locking position where it is locked by the locking block 10.

Figure 2A:
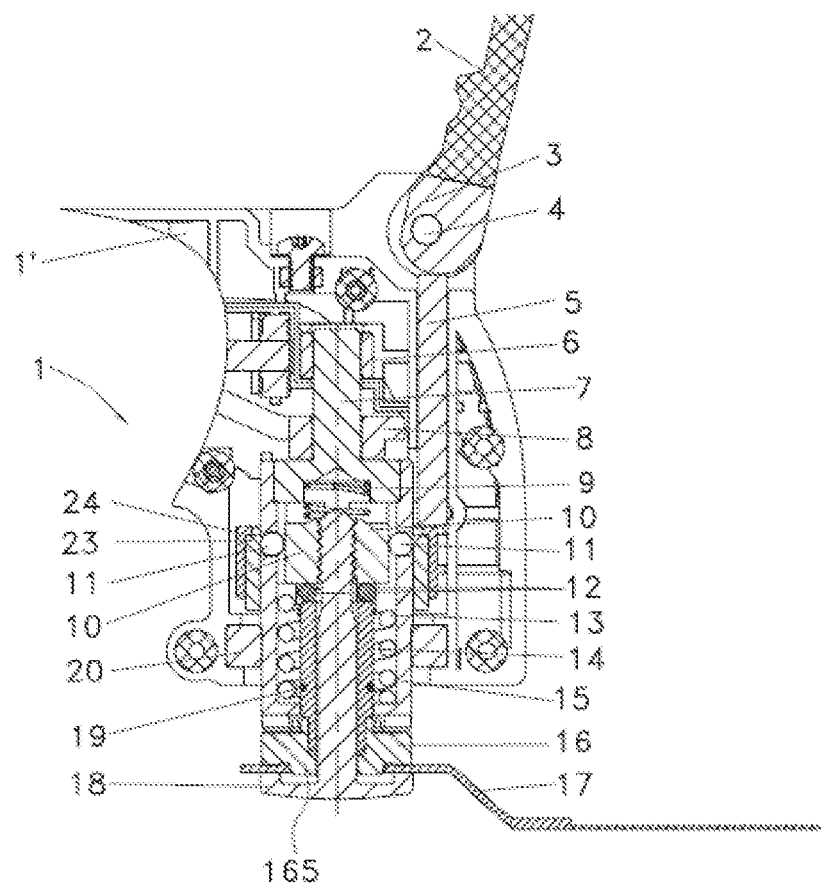
FIG. 2a is a schematic view of the power tool, wherein the working element can be rotated to adjust its angle, and the clamping device is in a rotatable position.
Figure 2B:
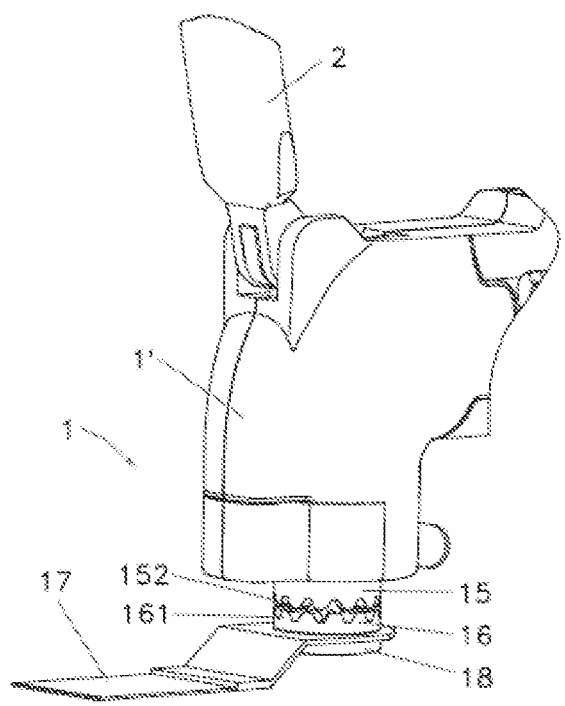

When the lever 2 is moved to the position shown in FIGS. 2a and 2b, the inner flange 16 is moved downwards and it is disengaged from the spindle 15. Meanwhile, the steel balls 11 still bear against the straight surface 233 of the pressing spring 23 and cannot roll radially outwards, so the locking block 10 is still engaged with the clamping shaft 182. Since the form-fit structure is annular grooves, the inner flange 16 can be rotated to change the orientation of the working element 17 relative to the power tool 1, thereby the angle adjustment of the working element 17 is achieved. At this moment, the working element 17 is still clamped between the inner flange 16 and the fastening element 18, and the clamping shaft 182 is in a second locking position where the clamping shaft 182 cannot be moved axially relative to the locking blocks 10. But the fastening element 18, the working element 17, the inner flange 16 and the tube 14 can be rotated about the axis of the spindle 15.

Figure 3A:
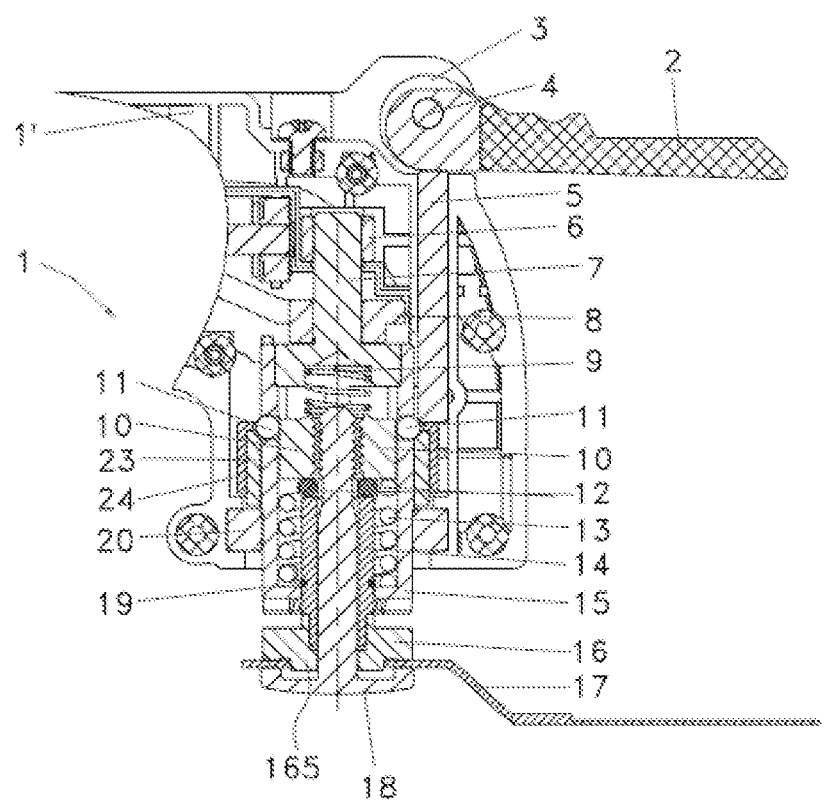
FIG. 3a is a schematic view of the power tool, wherein the working element can be removed, and the clamping device is in the release position.
Figure 3B:
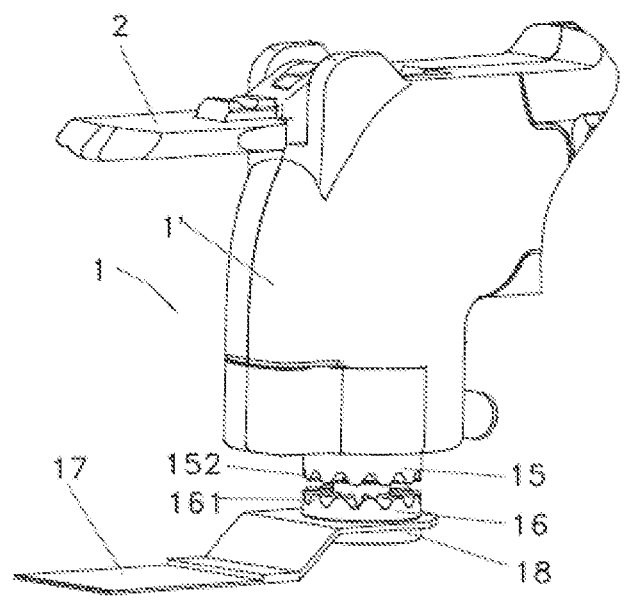

When the lever 2 is moved to the release position shown in FIGS. 3a and 3b, the pressing rod 5 is pressed downwards by the eccentric block 3 to the largest extent. At this time, the pressing ring 23 is pushed by the pressing rod 5, the pin is then pushed by the pressing ring 23, and the inner flange 16 is pushed by the pin 12 to move downwards. The lower end of the locking block 10 is free, and the upper end of the locking block 10 is biased by the pressure spring 9. The locking block 10 is finally stopped by the stopping plate (not shown). Then, the fastening element 18 can be pulled downwards. Since the annular grooves have an oblique surface, the pulling force acting on the clamping shaft 182 make the locking blocks 10 move away from each other radially. As a result, the fastening element 18 can be removed, and then the working element 17 can be removed. Specifically, when the steel balls 11 roll to the oblique surface 232 of the pressing ring 23, a space is formed for the locking block 10 to move radially, as a result, the locking block 10 can move radially outwards.

In this illustrated embodiment, the spindle 15 and the inner flange 16 are provided with grooves 152 and projections 161 having a certain slope respectively which can be engaged with each other. Thus, the spindle 15 and the inner flange 16 can be engaged with each other closely without clearance. Moreover, the clearance produced due to the wearing of the projections 161 can be compensated.

Figure 4C:
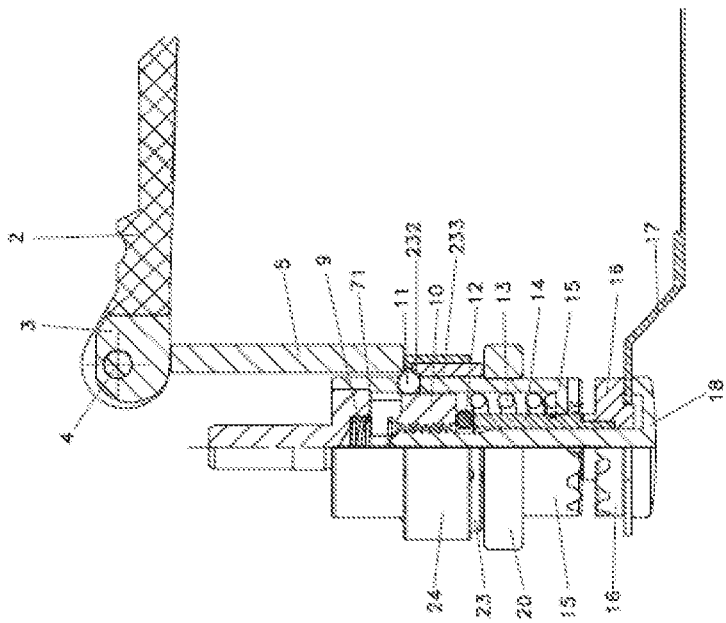
FIG. 4c is a half sectional view showing that the working element can be removed, wherein the operating member is in a third action position.
Figure 4B:
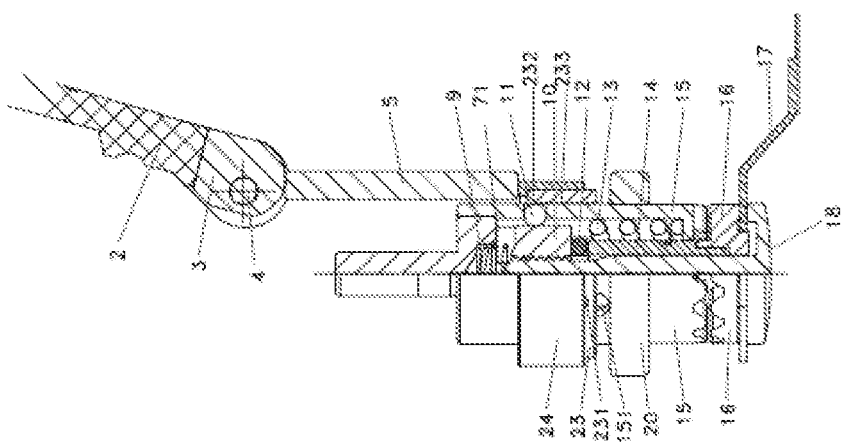
FIG. 4b is a half sectional view showing that the working element may be rotated to adjust the angle, wherein the operating member is in a second action position.
Figure 4A:
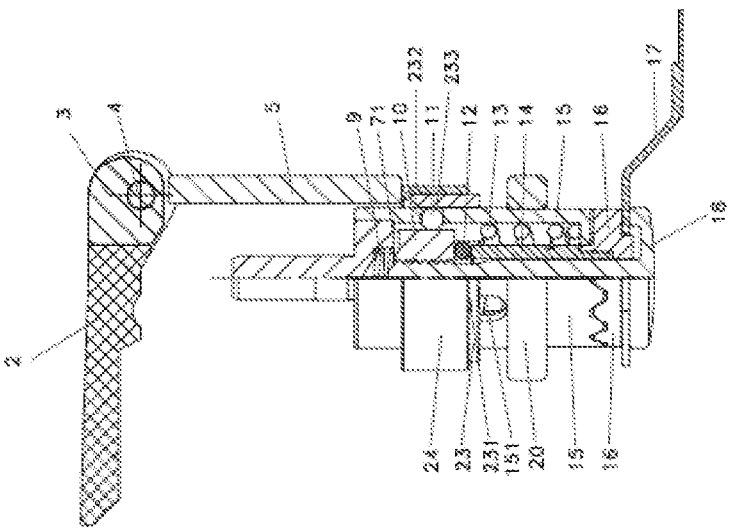
FIG. 4a is a half sectional view showing the working element in the clamped state, wherein an operating member is in a first action position.

As shown in FIGS. 1a, 1b and 4a, it can be seen that the projections 161 of the inner flange 16 and the grooves 152 of the spindle 15 are completely engaged with each other in the clamping state.

As shown in FIGS. 2a, 2b and 4a, the highest points of the projections 161 of the inner flange 16 is lower than that of the projections formed between the grooves 152 of the spindle 15, that is to say, the inner flange 16 is disengaged from the spindle 15 which can be rotated relative to each other. At this moment, the clamping shaft 182 of the fastening element 18, the working element 17 and the inner flange 16 can be rotated to change the orientation of the working element 17 relative to the power tool 1. As a result, the angle adjustment of the working element 17 is achieved. If the working element 17 is needed to be clamped again, the lever 2 can be moved in the reverse direction to obtain an automatic clamping. Due to the special design of the projections 161, the projections 161 of the inner flange 16 can slide into the grooves 152 on the end surface of the spindle 15 under the action of the large spring 13, even if the projections 161 do not align with the grooves 152 initially.

As shown in FIGS. 1a, 2a and 3a, regardless of the working element 17 in the clamping position, the rotating position and the released position, it is not disengaged from the projection 165 which drives the working element 17 to oscillate, which is helpful for the angle adjustment of the working element.

Figure 5:
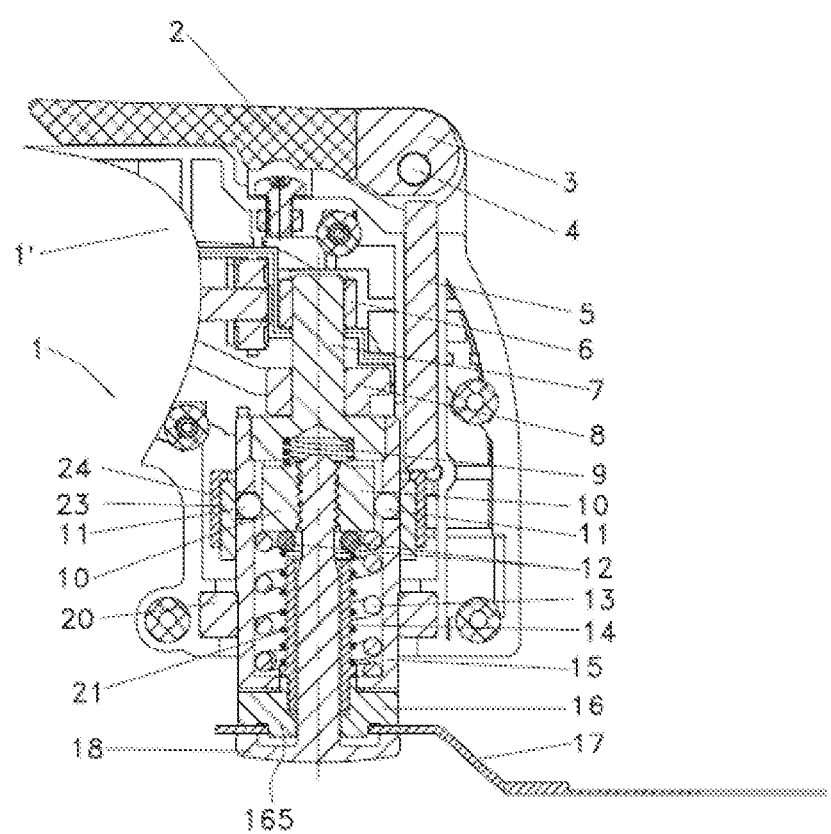
FIG. 5 is a schematic view showing the power tool, wherein a small spring acting on an inner flange is arranged in the driving spindle.

As shown in FIG. 5, a small spring 21 is further provided between the pin 12 and the inner flange 16. The small spring 21 has one end bearing against the pin 12 and another end bearing against the step formed on the tube 14. With the arrangement of the small spring 21, it can make sure that in the clamped position, the upper end of the tube 14 does not contact the pin 12. Thus there is a space for the large spring 13 to press on the locking block 10. In the rotating position, the upper end of the tube 14 still does not contact the pin 12, the pressure spring 9 pushes the tube 14 and the inner flange 16 to move downwards so as to be disengaged from the projections on the end of the spindle 15. Meanwhile, it makes sure that the inner flange 16 has a certain pressure to press on the working element 17, and a clamp is produced when the working element 17 is rotated, thus the working element 17 can be stopped at any angle position. In the release position, the upper end of the tube 14 comes into contact with the pin 12, thus it makes sure that the inner flange 16 cannot move and cannot engage with the projections on the end surface of the spindle 15 when the working element 17 is assembled. Thus in the clamping position, the axial positions of the inner flange 16 are always the same, thereby ensuring that the inner flange 16 can be rotated freely in the next rotating position.

Figure 6:
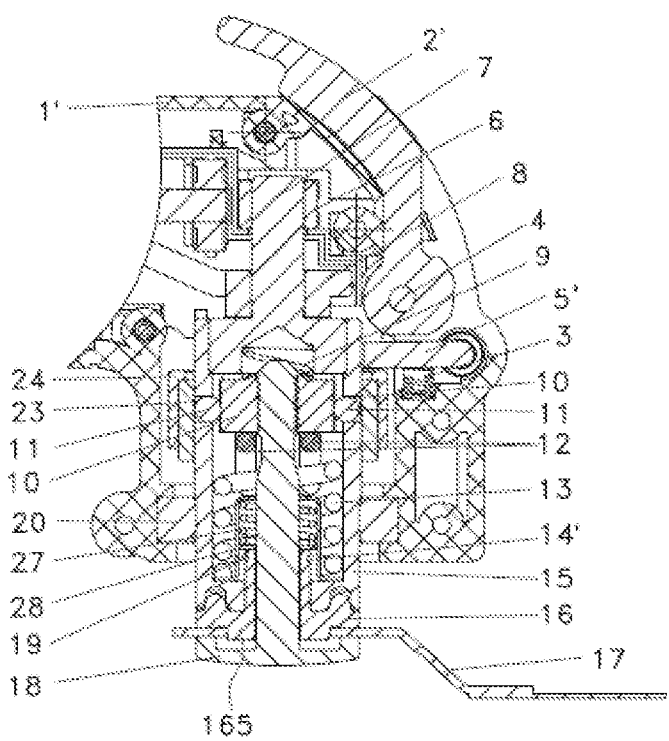
FIG. 6 is a schematic view showing a further clamping device tool according to the description that follows.

FIG. 6 shows a further example of the power tool wherein the working element can be rotated. The structures and reference numerals similar to the above described example are not explained again for the sake of brevity. Next, three features of this example differing from the above embodiment are explained in details.

Firstly, the operating assembly comprises a cam lever 2' and a coupling fork 5'. The cam lever 2' has an eccentric surface composed of multiple sections. When the cam lever 2' is rotated, the coupling fork 5' is pushed by the eccentric surface to rotate. Thereby the pressing ring 23 is pushed by the rotating coupling fork 5' to move.

Secondly, in the above described first example, the disengagement of the inner flange 16 and the spindle 15 is achieved through the pin 12 pushing the tube 14. In the presently described example, the disengagement is achieved through the pin 12 pushing a stopping sleeve 14' and a spring 27 in the stopping sleeve biasing the inner flange 16 outwardly. The upper end of the spring 27 is stopped by the stopping sleeve 14' and the lower end thereof abuts against a spacer 28 arranged on the top of the inner flange 16. The inner flange 16 is pushed out by the spring 27. So when the pin 12 is moved downwardly, it does not rigidly contact the stopping sleeve 14'. Meanwhile, the spring force is always acted on the inner flange 16, so it has a damping force when the working element 17 is rotated. As a result, the working element 17 can be stopped at any angular position, and a good hand feeling is obtained.

Thirdly, the engagement method of the inner flange 16 and the spindle shaft 15 are different from the above first embodiment. Referring to FIG. 7, the projections 161' of the inner flange 16 are evenly distributed on the first end 163 facing the spindle, and have a similar cylindrical shape. The lower end of the spindle 15 has concave cavities 152' for accommodating the projections 161' of the inner flange. The projections of the inner flange can be inserted into and engaged with the concaves cavities of the spindle 15 for preventing the relative rotation between the inner flange and the spindle shaft.

FIGS. 8a and 8b show another example of the power tool having the angular adjustment function of the working element. The power tool 1 comprises a motor 30, a transmission mechanism 40 and a coupling fork 6. The transmission mechanism 40 comprises an eccentric bearing 41. The coupling fork 6 has a first end 61 connected to the eccentric bearing 41 and a second end 62 connected to the driving shaft of the working element 17. When the first end 61 of the coupling fork 6 oscillates back and forth with the rotation of the eccentric bearing 41, the second end 62 of the coupling fork 6 drives the supporting shaft neck 7 of the driving shaft to rotate back and forth in a small oscillating angle about the longitudinal axis Y (as indicated by the rotating arrow in the drawing).

FIG. 8a is an isometric view of the working element in a first working position, taking the axial direction of the motor as reference. The working element 17 is clamped by facing the front. When the first end 61 of the coupling fork 6 is rotated by an angle relative to the eccentric bearing 41, it brings the driving shaft (including the shaft neck 7 and the spindle shaft 15) of the working element 17 to rotate to a new position. At this moment, as shown in FIG. 8b, the working element 17 is in a second working position that has a turning angle relative to the first working position, and the working element 17 is clamped facing a side.

In this example, the clamping device for clamping the working element has the same structure as the above embodiment(s), thus it is unnecessary to go into details. The difference lies in that the torque driving structure is arranged on the shaft end of the spindle 15. Preferably, the torque driving structure is configured as a projection (not shown) for transmitting the torque acting on the working element 17 by the driving shaft. The angular adjustment of the working element 17 is obtained by adjusting the angular position of the driving shaft. During this process, the working element 17 is always clamped on the power tool 1. Thus, the angular adjustment of the working element 17 can be obtained without disengaging from the projection of the spindle.

What is claimed is:

1. A power tool, comprising:
   a driving shaft for driving a working element;
   a clamping device for clamping the working element to the driving shaft, the clamping device having a clamping position where the working element is fixed relative to the driving shaft and a release position where the working element is removable from the driving shaft;
   an operating member coupled to the clamping device, the operating member being manually moveable to cause the clamping device to move between the clamping position and the release position; and
   a flange member connected with the driving shaft and driving the working element;
   wherein the operating member drives the flange member to move along a longitudinal axis of the driving shaft, the clamping device further has a rotating position in which the working element is clamped on the power tool and free to be angularly rotated relative to the driving shaft, and the operating member is moveable to an operating position corresponding to the rotating position,
   wherein the driving shaft comprises a hollow spindle and the clamping device comprises a fastening element having a clamping shaft insertable into the spindle and a locking assembly for locking the clamping shaft in the spindle,
   wherein in the clamping position, the fastening element is locked by the locking assembly and located in a first locking position, in the rotating position, the fastening element is locked by the locking assembly and located in a second locking position, and in the release position, the fastening element is releasable from the locking assembly, and
   wherein the locking assembly comprises a locking member, an intermediate member and a moving member, the intermediate member is engaged between the locking member and the moving member, the moving member has a concave portion and a straight portion, and the intermediate member is abutted against one of the concave portion and the straight portion selectively.

2. The power tool according to claim 1, wherein the working element is driven in an oscillating manner about the longitudinal axis of the driving shaft.

3. The power tool according to claim 1, wherein the locking member is connected to the clamping shaft of the fastening element by a form-fit structure in the first and second locking positions.

4. The power tool according to claim 3, wherein the form-fit structure comprises annular grooves or teeth formed on the clamping shaft and the locking member.

5. The power tool according to claim 1, wherein the flange member has a first end adapted for mating with the driving shaft and a second end for clamping the working element to the fastening element.

6. The power tool according to claim 1, wherein, when the clamping device is in the clamping position, the flange member is non-rotatably connected to the driving shaft and the working element is clamped between the flange member and the fastening element, when the clamping device is in the rotating position, the flange member is disengageable from the driving shaft and the working element is clamped between the flange member and the fastening element, and, when the clamping device is in the release position, the flange member is disengageable from the driving shaft, and the working element is removable from the driving shaft.

7. A power tool, comprising:
a driving shaft for driving a working element;
a clamping device for clamping the working element to the driving shaft, the clamping device having a clamping position where the working element is fixed relative to the driving shaft and a release position where the working element is removable from the driving shaft; and
an operating member coupled to the clamping device, the operating member being manually moveable to cause the clamping device to move between the clamping position and the release position;
wherein the clamping device further has a rotating position in which the working element is clamped on the power tool and free to be angularly rotated relative to the driving shaft, the operating member is moveable to an operating position corresponding to the rotating position, and the clamping device comprises a fastening element driven by the operating member to move along a longitudinal axis of the driving shaft between a first locking position and a second locking position,
wherein the driving shaft comprises a hollow spindle and the fastening element of the clamping device comprises a clamping shaft insertable into the spindle and a locking assembly for locking the clamping shaft in the spindle,
wherein in the clamping position, the fastening element is locked by the locking assembly and located in the first locking position, in the rotating position, the fastening element is locked by the locking assembly and located in the second locking position, and in the release position, the fastening element is releasable from the locking assembly, and
wherein the locking assembly comprises a locking member, an intermediate member and a moving member, the intermediate member is engaged between the locking member and the moving member, the moving member has a concave portion and a straight portion, and the intermediate portion is abutted against one of the concave portion and the straight portion selectively.

* * * * *